United States Patent
Krause

(10) Patent No.: US 8,838,907 B2
(45) Date of Patent: Sep. 16, 2014

(54) NOTIFICATION PROTOCOL BASED ENDPOINT CACHING OF HOST MEMORY

(75) Inventor: Michael R. Krause, Boulder Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 13/384,700

(22) PCT Filed: Oct. 7, 2009

(86) PCT No.: PCT/US2009/059779
§ 371 (c)(1),
(2), (4) Date: Jan. 18, 2012

(87) PCT Pub. No.: WO2011/043769
PCT Pub. Date: Apr. 14, 2011

(65) Prior Publication Data
US 2012/0117331 A1      May 10, 2012

(51) Int. Cl.
*G06F 12/08* (2006.01)
*G06F 13/28* (2006.01)

(52) U.S. Cl.
CPC ............ *G06F 12/0835* (2013.01); *G06F 13/28* (2013.01); *G06F 2212/621* (2013.01); *G06F 12/0815* (2013.01); *G06F 2212/1024* (2013.01)
USPC ................. 711/141; 710/22; 710/28

(58) Field of Classification Search
CPC ....................................... G06F 13/28
USPC .......................................... 711/141
See application file for complete search history.

(56) References Cited

U.S. PATENT DOCUMENTS

| | | | | |
|---|---|---|---|---|
| 5,953,538 | A * | 9/1999 | Duncan et al. | 710/22 |
| 5,966,728 | A * | 10/1999 | Amini et al. | 711/146 |
| 6,725,281 | B1 * | 4/2004 | Zintel et al. | 719/318 |
| 2003/0101190 | A1 | 5/2003 | Horvitz et al. | |
| 2004/0158685 | A1 * | 8/2004 | Jones et al. | 711/147 |
| 2005/0050141 | A1 * | 3/2005 | An et al. | 709/203 |
| 2005/0066058 | A1 * | 3/2005 | An et al. | 709/246 |
| 2005/0251626 | A1 * | 11/2005 | Glasco | 711/133 |

(Continued)

OTHER PUBLICATIONS

AMD, HP Propose More Efficient PCIe 3.0 Specs, Jul. 31, 2009, Electronista, p. 1.*

(Continued)

*Primary Examiner* — April Y Blair
*Assistant Examiner* — Kenneth Tsang

(57) ABSTRACT

An endpoint device (14) is registered in association with a host memory address in response to receipt of a request for a notification of a change in content state of the host memory address from the endpoint device (14). In response to a change in content state of the host memory address, a notification that the host memory address has changed content state is sent to the endpoint device (14). In response to receipt of the notification by the endpoint device (14), semantics associated with a change of content state of the host memory address by a data schema (42) is determined and an action is performed by the endpoint device (14) in accordance with the determined semantics.

20 Claims, 8 Drawing Sheets

(56) References Cited

U.S. PATENT DOCUMENTS

| | | | |
|---|---|---|---|
| 2006/0004837 A1 | 1/2006 | Genovker et al. | |
| 2006/0112252 A1* | 5/2006 | Dixon | 711/170 |
| 2006/0176271 A1 | 8/2006 | Polivy et al. | |
| 2008/0091915 A1* | 4/2008 | Moertl et al. | 711/206 |
| 2008/0133709 A1* | 6/2008 | Aloni et al. | 709/218 |
| 2008/0147938 A1* | 6/2008 | Freimuth et al. | 710/105 |
| 2009/0112894 A1* | 4/2009 | Idei et al. | 707/100 |
| 2009/0113202 A1* | 4/2009 | Hidle | 713/151 |
| 2009/0245183 A1 | 10/2009 | Baker et al. | |

OTHER PUBLICATIONS

EPO; "European Search Report" cited in EP09850311.3; dated Oct. 19, 2013.

International Searching Authority, International Search Report and Written Opinion, Jul. 1, 2010, 12 pages.

Chinese Office Action cited in Appl. No. 20090161851.1; mailed Mar. 3, 2014; 8 pages.

* cited by examiner

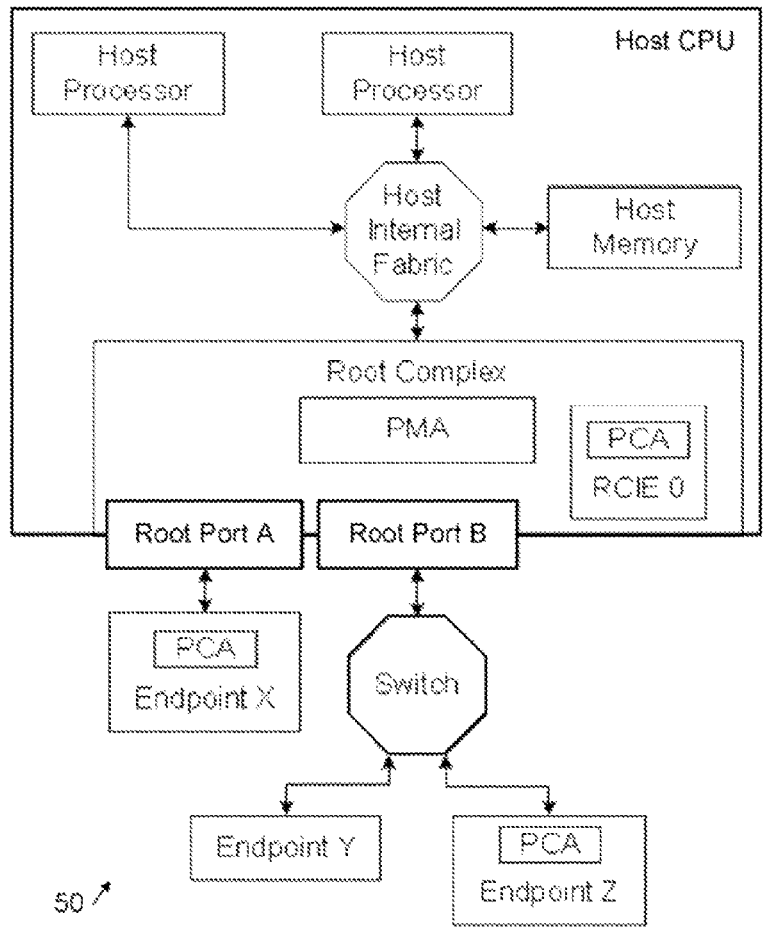
FIG. 5
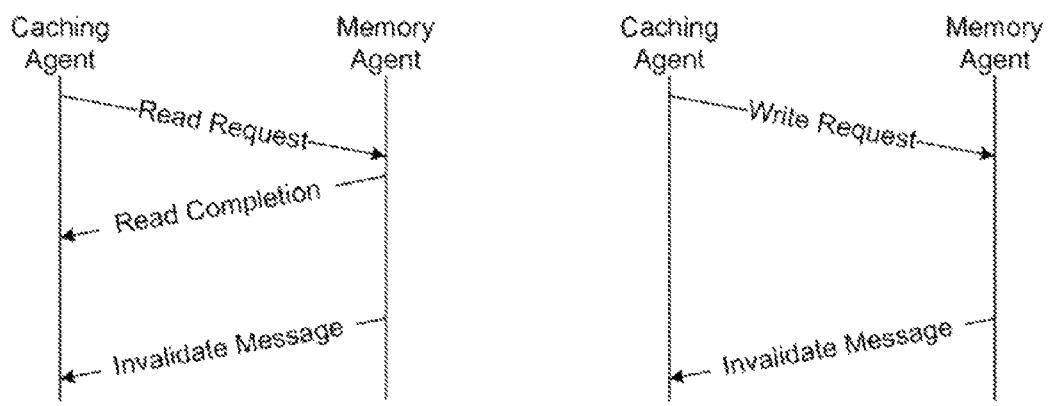
FIG. 6A
FIG. 6B

| 7 6 5 4 | 3 2 1 0 | 7 | 6 5 4 | 3 | 2 1 0 | 7 6 5 | 4 3 2 | 1 0 | 7 6 5 4 3 2 1 0 |
|---|---|---|---|---|---|---|---|---|---|
| +0 | | | +1 | | | +2 | | | +3 |
| Fmt 0 1 1 | Type 0 1 r₂ r₁ r₀ | R | TC 0 0 0 | R | Attr 0 | R T T H D | E P | Attr 0 0 | AT | Length 00 0000 0010 |
| Requester ID | | | | | | Tag (Reserved) | | | Message Code 0111 1111 |
| Device ID (if directed) or Reserved (if broadcast) | | | | | | Vendor ID 0000 0000 0000 0001 | | | |
| Reserved | | | | | | Subtype 0000 0000 | | | |
| Invalidation Address [63:32] | | | | | | | | | |
| Invalidation Address [31:6] | | | | | | | | | Reserved | E V |

FIG. 7

NOTIFICATION PROTOCOL BASED ENDPOINT CACHING OF HOST MEMORY

BACKGROUND

Computer systems typically include a central processing unit (CPU), high-speed devices (e.g., host cache memory and graphics controllers), and peripheral buses (e.g., peripheral component interconnect (PCI) or PCI Express (PCIe) bus) and on-chip integrated peripheral components (e.g., network interface controller, universal serial bus ports, flash memory, and audio devices). Some computer systems have a host interface that includes a memory controller hub and an input/output (I/O) controller hub. The memory controller hub connects the CPU to the high-speed components of the computer system via a coherent interconnect, which may be implemented by a front side bus or a serial interface, such as QPI (Intel® QuickPath Interconnect) or cHT (coherent Hyper-Transport). The I/O controller hub connects the memory controller hub to the peripheral buses and the integrated peripheral components via a hub interconnect. The peripheral components communicate with the I/O controller hub in accordance with a peripheral bus protocol. For example, in modern Intel® hub architectures, peripheral components typically communicate with the CPU via the PCI communication protocol or the PCIe communication protocol.

The host cache memory (also referred to as a "cache") is a local, high-speed memory that increases system performance by fetching and storing data that is located adjacent to the requested piece of data from a lower-level cache or a main memory. The host cache memory typically includes status bits that indicate the status of each cache line in order to maintain data coherency throughout the computer system. For example, in accordance with the "MOESI" cache coherency protocol, the status bits indicate the state of the associated cache line (e.g., owned (O), modified (M), exclusive (E), shared (S), or invalid (I)).

In many computer systems, data is transferred from the CPU to peripheral components using an I/O operation that typically involves moving the data to the main memory, and then reading the data from the main memory by the CPU or the peripheral components. For example, in transferring output data from the CPU to an I/O device, the CPU typically creates the output data, transfers the output data to the main memory, and stores pointers (also referred to as descriptors) to the output data in a known location. The CPU then issues a "door bell" event that notifies the I/O device that the output data is ready to be transmitted. In response to the doorbell event, the I/O device uses the pointers to transfer the output data from the main memory to the I/O device. New processor and I/O hub architectures allow transfers to occur directly from caches in addition main memory.

What are needed are apparatus and methods that provide improved I/O communications with reduced CPU involvement.

SUMMARY

In one aspect, the invention features a method in accordance with which an endpoint device is registered in association with a host memory address in response to receipt of a request for a notification of a change in content state of the host memory address from the endpoint device. In response to a change in content state of the host memory address, a notification that the host memory address has changed content state is sent to the endpoint device. In response to receipt of the notification by the endpoint device, semantics associated with a change of content state of the host memory address by a data schema is determined and an action is performed by the endpoint device in accordance with the determined semantics.

The invention also features apparatus operable to implement the method described above and computer-readable media storing computer-readable instructions causing a computer to implement the method described above.

DESCRIPTION OF DRAWINGS

FIG. 5 is a block diagram of an embodiment of a computer system architecture.

FIG. 6A is an interaction diagram between a caching agent and a memory agent in accordance with an embodiment of a notification protocol.

FIG. 6B is an interaction diagram between a caching agent and a memory agent in accordance with an embodiment of a notification protocol.

FIG. 7 shows an exemplary embodiment of an invalidate message in accordance with an embodiment of a notification protocol.

DETAILED DESCRIPTION

Figure 1:
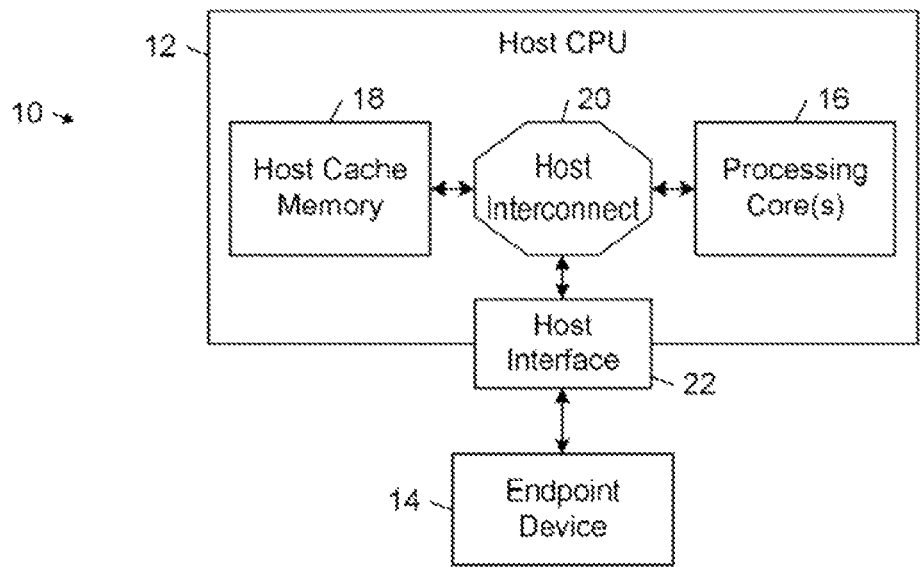
FIG. 1 is a block diagram of an embodiment of a computer system architecture that includes a host CPU connected to an endpoint device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "computer" is any machine, device, or apparatus that processes data according to computer-readable instructions that are stored on a computer-readable medium either temporarily or permanently. An "operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

A central processing unit (CPU) is an electronic circuit that can execute a software application. A CPU can include one or more processors (or processing cores). A "host CPU" is a CPU that controls or provides services for other devices, including I/O devices and other peripheral devices.

The term "processor" refers to an electronic circuit, usually on a single chip, which performs operations including but not limited to data processing operations, control operations, or both data processing operations and control operations.

The term "machine-readable medium" refers to any physical medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

The "content state" of a memory address refers to the state of the contents stored at the memory address in a computer-readable medium.

"Host cache memory" refers to high-speed memory that stores copies of data from the main memory for reduced latency access by the CPU. The host cache memory may be a single memory or a distributed memory. For example, a host cache memory may exist in one or more of the following places: on the CPU chip; in front of the memory controller; and within an I/O hub. All of these caches may be coherently maintained and used as sources/destinations of DMA operations.

An "endpoint" is an interface that is exposed by a communicating entity on one end of a communication link.

An "endpoint device" is a physical hardware entity on one end of a communication link.

An "I/O device" is a physical hardware entity that is connected to a host CPU, but is separate and discrete from the host CPU. An I/O device may or may not be located on the same circuit board as the host CPU. An I/O device may or may not be located on the same hardware die or package as the host CPU.

A "PCIe Caching Agent" (PCA) is a client subsystem that manages the caching of memory over PCIe using Rcoh protocol.

A "PCIe Memory Agent" (PMA) is a service subsystem that manages the exportation of cacheable memory over PCIe using Rcoh protocol.

Restricted Coherency (Rcoh) is a PCIe protocol that supports the caching of host cache memory across PCIe.

As used herein, the term "includes" means includes but not limited to, and the term "including" means including but not limited to. The term "based on" means based at least in part on.

II. OVERVIEW

The embodiments that are described herein provide improved I/O communications with reduced CPU involvement. These embodiments leverage notification protocol based endpoint caching of host cache memory in order to reduce CPU involvement in I/O communications. The cache-based notification protocol enables I/O latency and consumed I/O bandwidth to be reduced significantly. In addition, this protocol also enables direct signaling between host software and endpoint devices.

FIG. 1 shows an embodiment of a computer system architecture 10 that includes a host CPU 12 connected to an endpoint device 14. The host CPU 12 includes one or more processing cores 16, a host cache memory 18, a host interconnect 20, and a host interface 22.

The host interconnect 20 interconnects the processing core(s) 16 and the host cache memory 18. The host interconnect 20 may be implemented by any of a variety interconnection technologies. For example, in some embodiments, the host interconnect 20 may be implemented by a cross-bar switch fabric.

The host interface 22 connects the host CPU 12 to the endpoint device 14. The host interface 22 may be implemented by a variety of different interconnection mechanisms. For example, in accordance with an Intel® hub architecture, the host interface 20 is implemented by a memory controller hub and an I/O controller hub that are linked by a hub interconnect. The memory controller hub connects the host CPU 12 to the higher-speed components of the computer system via a coherent interconnect (e.g., a front side bus or a serial interconnect) that is used to exchange information via a coherency protocol. The I/O controller hub connects the memory controller hub to lower speed devices, including peripheral devices such as the endpoint device 14.

In general, the peripheral devices communicate with the I/O controller hub in accordance with a peripheral bus protocol. Some of the peripheral devices may communicate with the I/O controller hub in accordance with a standard peripheral communication protocol, such as the PCI communication protocol or the PCIe communication protocol. The peripheral bus protocols typically are multilayer communication protocols that include transaction, routing, link and physical layers. The transaction layer typically includes various protocol engines that form, order, and process packets having system interconnect headers. Exemplary types of transaction layer protocol engines include a coherence engine, an interrupt engine, and an I/O engine. The packets are provided to a routing layer that routes the packets from a source to a destination using, for example, destination-based routing based on routing tables within the routing layer. The routing layer passes the packets to a link layer. The link layer reliably transfers data and provides flow control between two directly connected agents. The link layer also enables a physical channel between the devices to be virtualized (e.g., into multiple message classes and virtual networks), which allows the physical channel to be multiplexed among multiple virtual channels. The physical layer transfers information between the two directly connected agents via, for example, a point-to-point interconnect.

Other peripheral devices (including the endpoint device 14) are configured to communicate with the I/O hub controller in accordance with a notification protocol that enables these peripheral components to cache lines of the host cache memory 18 and be notified of any subsequent changes in the content state of the cached lines. The notification protocol enables the endpoint device 14 to cache data instead of transferring it over the peripheral bus for each access, thereby reducing I/O latency and consumed bandwidth for some use models. Reducing I/O bandwidth consumption also reduces host memory bandwidth consumption. The notification protocol also enables host software to signal the endpoint device 14 by updating a cacheline instead of performing programmed I/O (PIO) operations, thereby avoiding high software overhead and synchronization and flow-control issues.

The entities that communicate in accordance with the notification protocol typically include respective agents that implement a modified version of a standard peripheral bus protocol (e.g., PCIe). In addition to implementing the functions of the standard peripheral bus protocol, these agents also are configured to manage the data that is cached by the endpoints. For example, in some embodiments, the endpoint 14 includes a caching agent that manages the cached data within the endpoint 14, and routing components and/or the host CPU 12 include memory agents that track which lines of the host cache memory 18 have been cached. These agents typically may be located in any of a variety of different components of the endpoint device 14, the routing components, and the host CPU 12. In some embodiments, the host CPU 12 includes the memory agent in the host interface 22.

In some embodiments, the agents carry out PCIe transactions that include mechanisms for the endpoints to register an interest in particular cachelines (host memory addresses) and for the host CPU to notify the endpoints that the content states of the particular cachelines have changed. In some of these embodiments, the notification mechanism is implemented by a minor modification to the wire protocol that allows the caching agent in the endpoint 14 to inform the memory agent in the host CPU 12 that the device is interested in a particular cacheline. In some of these embodiments, the caching agent sets a bit in the transaction on the link connection with the memory agent. The memory agent interprets the set bit as a request to notify the caching agent in the endpoint device 14 of any change in the content state (e.g., change in contents) of a particular host memory address that is identified in an associated DMA access request (e.g., a read or write) that is described in the transaction. In response, the memory agent registers the endpoint device for notification in association with a change in content state of the host memory address. When the memory agent determines that the particular cacheline has been updated (e.g., a new value has been written to it), the memory agent identifies all the entities that have registered an interest in that cacheline and generates a respective notification message for each of the endpoints that are interested in the cacheline whose content state changed. The message typically simply indicates that the state of the contents of the particular cacheline has changed.

Figure 2:
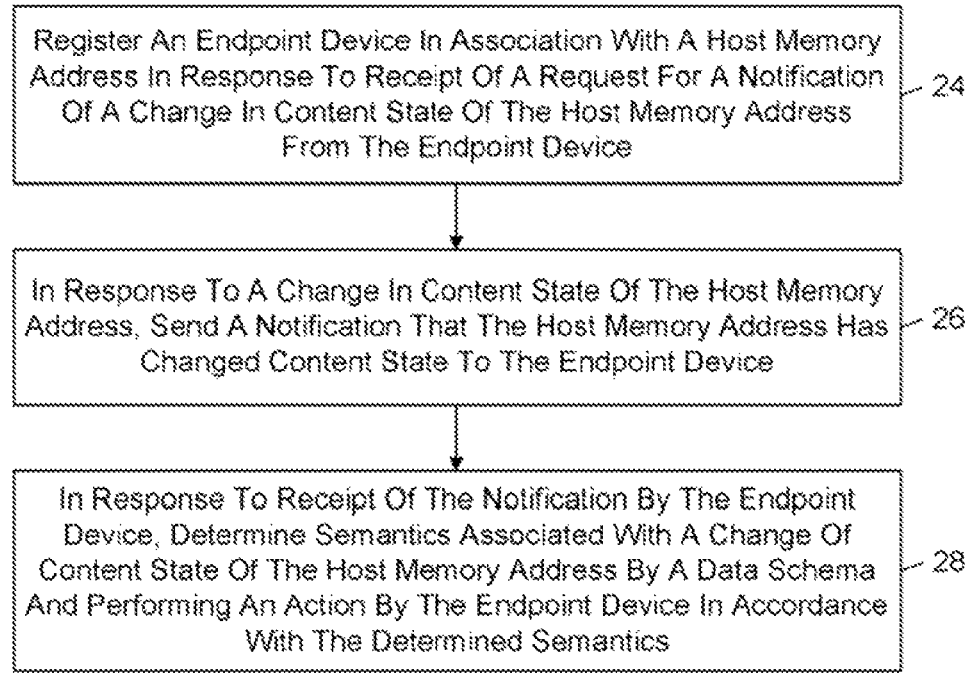
FIG. 2 is a flow diagram of an embodiment of a method of endpoint caching of host cache memory in accordance with an embodiment of a notification protocol.

FIG. 2 shows an embodiment of a method of endpoint caching of host cache memory in accordance with an embodiment of a notification protocol based usage model. In accordance with this method, a memory agent registers an endpoint device in association with a host memory address in response to receipt of a request for a notification of a change in content state of the host memory address from the endpoint device 14 (FIG. 2, block 24). In response to a change in content state of the host memory address, the memory agent sends a notification that the host memory address has changed content state to the endpoint device 14 (FIG. 2, block 26). In response to receipt of the notification by the endpoint device 14, the caching agent determines semantics that are associated with a change of content state of the host memory address by a data schema, and the endpoint device 14 performs an action in accordance with the determined semantics (FIG. 2, block 28).

As explained in detail below, a wide variety of usage models may be implemented based on the lightweight notification enabled by the notification protocol. For example, one or more entities that are configured to communicate in accordance with the notification protocol may coordinate their actions through a shared data schema that associates a set of addresses in the host cache memory with semantics that give meaning to notifications of changes in the content states of the host memory addresses. For example, a change of content state notification for a particular host memory address may trigger any of the following actions by the receiving entity: advance to next work request, obtain the next block of memory for data movement, advance to the next round of calculation, and return a result of a calculation. Individual usage models may adopt one or more possible semantics being allowed for a given data schema; for example, updates to one portion of a data schema translate into semantic A, while updates to a different portion translate into semantic B. Usage models can take advantage of a wide range of semantics to either accelerate calculations, reduce the processor/memory bus utilization, and so forth, which can lead to more efficient operation and potential power savings, among other benefits.

Figure 3:
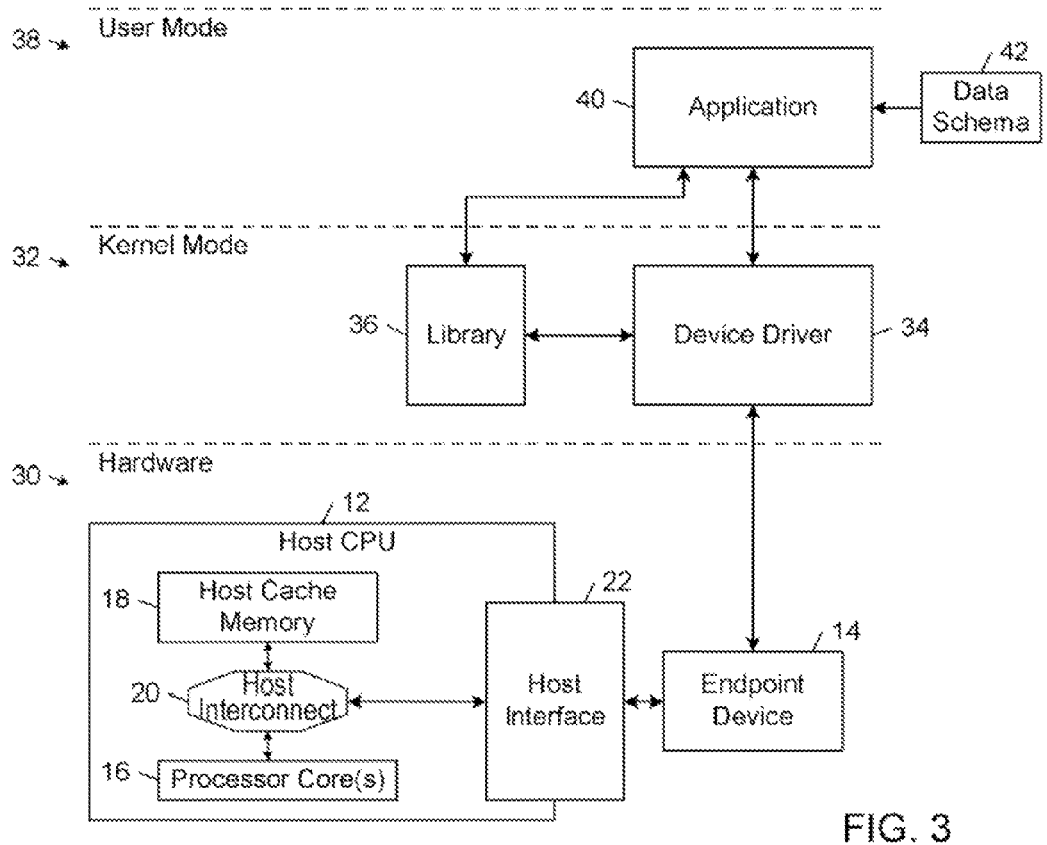
FIG. 3 is a block diagram of an embodiment of a computer system architecture

FIG. 3 shows an embodiment 30 of the computer system architecture 10 (FIG. 1) that additionally includes kernel mode components 32 and user mode components 38. The kernel mode components include a device driver 34 and a library 36. The user mode components 38 include an application 40 that reads a data schema 42, which associates semantics with host memory addresses. The data schema 42 may be specified in any of a variety of different formats. In some embodiments, the data schema 42 is specified in an extended markup language (XML) format. The data schema 42 may be a standardized schema that is applicable to multiple application environments or it may be unique to a particular application environment.

The application 40 implements a particular usage model by calling functions or services through application programming interfaces (APIs) provided by the library 36. In response, the library generates a series of API calls that are read by the device driver 34. In this process, the device driver 34 programs the endpoint device 14 with the base address of the data schema 42. The endpoint device 14 reads the data schema 42 in order to determine the semantics that respectively are associated with notifications that the content states particular host memory addresses have changed. For example, in some embodiments, the data schema 42 may indicate that: a content state change notification associated with the offset address X from the base address means that the data schema 42 should be read at that address and the action A1 should be taken; a content state change notification associated with the offset address Y from the base address means that the data schema 42 has been updated and the action A2 should be taken; and a content state change notification associated with the offset address Z from the base address means that the results of a calculation should be written back to offset address Z from the base address and to inform another endpoint device that the results are ready for processing.

Figure 4:
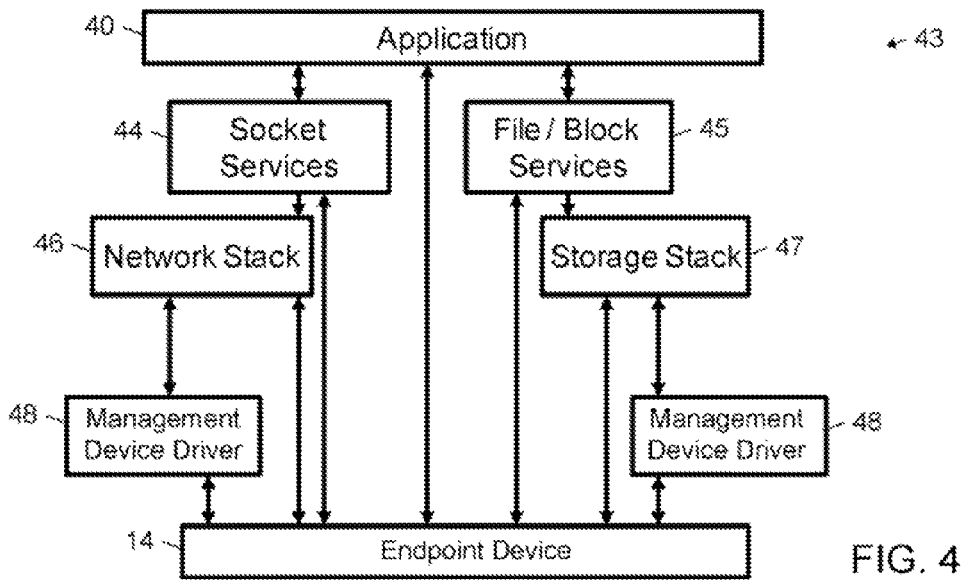
FIG. 4 is a diagrammatic view of an embodiment of computer software stack between an application and an endpoint device.

FIG. 4 is a diagrammatic view of an embodiment of a conceptual computer software stack 43 between the application 40 and the endpoint device 14 that is enabled by the notification protocol. As shown in FIG. 4, the notification protocol provides multiple options for direct hardware access through the application 40 as well as through traditional operating system components, such as socket services 44, file/block services 45, the network protocol stack 46, and the storage protocol stack 47. These features of the notification provide new opportunities to eliminate software overhead and enable new communication paradigms (e.g., parallel and lock free communications). In addition, the notification protocol enables the traditional device driver in the main data path to be replaced by one or more management device drivers 48, 49 which represent a canonical endpoint device definition (e.g., in the manner of a USB/class driver style) that provides more direct hardware access.

III. EXEMPLARY NOTIFICATION PROTOCOL

A. Overview

As explained above, the notification protocol enables peripheral endpoint devices to cache lines of the host cache memory 18 and be notified of any subsequent changes in the content state of the cache lines. This section describes an exemplary notification protocol (referred to herein as the "Restricted Coherency" or "Rcoh" protocol) that corresponds to an augmented version of the PCIe protocol (see, e.g., PCI-Express™ Base Specification version 2.0, Dec. 20, 2006, the entirety of which is incorporated herein by reference).

The Rcoh protocol enables the caching of memory across a PCIe interconnect. Specifically, endpoints are enabled to cache host memory cachelines (also referred to herein as "lines"), and be notified if some entity (e.g., a CPU or a device) writes to a line that the endpoint has cached. While the protocol permits multiple endpoints to cache any given line concurrently, the protocol is restricted in the sense that an endpoint is never given exclusive ownership of a line, so the protocol alone can't coordinate concurrent updates by multiple writers.

The Rcoh protocol is implemented by a PCIe Caching Agent (PCA) in an endpoint and a PCIe Memory Agent (PMA) in the host system. A PCA is a client subsystem in an endpoint that manages the caching of memory over PCIe. A PMA is a service subsystem in the host that exports cacheable memory over PCIe. The Rcoh protocol provides a notification service for when a cacheline is modified. For reads, a PCA sends an Rcoh Read to a Memory Space range that has an associated PMA, requesting a copy of a cacheline or "line". The PMA returns the requested line to the PCA and records that the PCA has a cached copy of the line. Later, the PMA notifies the PCA via an Rcoh Invalidation Message if another entity updates the line, so the PCA can invalidate its copy of the line. A similar notification service exists for writes, where a PCA writing a line can request to be notified later if the line is updated.

Rcoh is a restricted coherency protocol in that PCAs are never given exclusive ownership of a line. Rcoh protocol permits multiple PCAs each to have a shared copy of any given line concurrently, but Rcoh protocol doesn't coordinate updates performed by multiple writers. An endpoint with PCA is permitted to write to a line at any time, regardless of whether the PCA has a pending notification for that line. If coordination between multiple writers is required, it must be accomplished by other protocols, which are outside the scope of this specification.

The Rcoh notification protocol defines Rcoh Reads and Rcoh Writes, which are similar in most respects to PCIe Memory Reads and PCIe Memory Writes, respectively. The most notable difference is that Rcoh Reads/Writes result in the endpoint being notified via the host sending an Rcoh Invalidate Message if a cached line is updated in the future. In some embodiments, the protocol supports two cacheline sizes (CLSs), 64 bytes and 128 bytes. Support for each CLS is optional, both for hosts and for endpoints.

Rcoh protocol support is optional normative, and is applicable to root complexes (RCs), Switches, and components with Endpoint Functions. Rcoh routing support is not applicable to PCIe to PCI/PCI-X Bridges. Rcoh protocol is architected for device-to-host Memory Requests, and should be enabled by software only if the Endpoint, RC, and all intermediate routing elements support the necessary Rcoh capabilities.

Endpoints with Rcoh Requester capability must support generating Rcoh Read Requests, Rcoh Write Requests, or both. Such endpoints must also support receiving Rcoh Invalidation Messages, and invalidate any cached lines accordingly. The PCA manages the cached data within the endpoint.

Routing elements (Switches and RCs) with Rcoh routing capability must support the proper forwarding of Rcoh Read and Rcoh Write Requests. Such routing elements must also forward Rcoh Invalidate Messages properly, including a directed version that targets a single endpoint plus a broadcast version that targets all components below a given Root Port. Downstream Ports must block any Rcoh Read or Rcoh Write Requests that attempt to go Downstream, reporting a new Rcoh Egress Blocked error in AER (Advanced Error Reporting; see below).

Root complexes (RCs) with Rcoh Completer capability must support receiving Rcoh Read and Rcoh Write Requests, and generating Rcoh Invalidate Messages as appropriate. One or more PMAs in the RC or the host track which lines have been cached by endpoints.

Software that supports Rcoh protocol discovers which components support Rcoh protocol and which CLSs they support. If the host, endpoints, and routing elements support the necessary Rcoh capabilities, software enables the endpoints to use Rcoh protocol, specifying which CLS to use.

B. Basic Rcoh Protocol

FIG. 5 is a block diagram of an embodiment of an exemplary computer system architecture 50 that includes host processors, host memory, a host internal fabric, Root Ports, Switches, and endpoints. FIG. 5 illustrates a simplified view of these elements and how they are interconnected to provide a context for understanding how Rcoh protocol operates. In the figure above, endpoint X, endpoint Z, and RCIE 0 each contain a PCA. The Root Complex contains a PMA.

FIG. 6A is an interaction diagram between a caching agent and a memory agent in accordance with an embodiment of a notification protocol. Basic Rcoh protocol is shown in the diagram above. For the case of reads shown on the left: (1) a PCA requests a copy of a line from host memory using an Rcoh Read Request; (2) the PMA returns the line in a Completion and records that the PCA has a copy; and (3) the PMA later notifies the PCA using an Rcoh Invalidate Message if it requires the PCA to invalidate its copy.

FIG. 6B is an interaction diagram between a caching agent and a memory agent in accordance with an embodiment of a notification protocol. For the case of writes shown on the right: (1) a PCA writes its copy of a line to host memory using an Rcoh Write Request; (2) the PMA records that the PCA has a pending notification for that line; and (3) the PMA later notifies the PCA using an Rcoh Invalidate Message if necessary.

A PMA will send an Rcoh Invalidate Message either if a cached line is written by some entity (e.g., a CPU or a device) or if the PMA is simply no longer going to track the content state of that line. FIG. 7 shows an exemplary embodiment of a Rcoh invalidate message 52. An EV bit in the Rcoh Invalidate message 52 indicates whether the Message was sent due to an eviction (EV is Set) or due to the line being written (EV is Clear). Once the PMA sends an Rcoh Invalidate for a line, it will not send an additional Rcoh Invalidate for that line unless it receives a new Rcoh Read or Rcoh Write Request.

If a Requester with a pending notification for a line sends a new Rcoh Read or Rcoh Write Request for that same line, the Requester generally cannot determine if a subsequent Rcoh Invalidation it receives for that line was for the most recent Rcoh Read/Write Request or for a previous one. Rcoh protocol by itself is not sufficient for a PCA to implement a coherent write-through cache, due to the response-less nature of Rcoh Invalidates.

C. Rcoh Protocol Summary

The following describes the rules and requirements for the Rcoh protocol plus some unique requirements.

- Rcoh Read and Rcoh Write Requests are considered to be additional forms of PCIe Memory Read and PCIe Memory Write Requests, respectively.
- All requirements for PCIe Memory Read Requests apply to Rcoh Read Requests unless explicitly stated otherwise.
    - The Rcoh Read Request TLP format is identical to the PCIe Memory Read Request TLP format except for the Type field code.
    - An Rcoh Read Request must access no more than a single cacheline, as determined by the Rcoh System CLS. A Completer must check for this error case and handle it as a Completer Abort unless the Completer detects a higher precedence error. Partial cacheline reads, including zero-length reads, are permitted.
    - If a Completer handles an Rcoh Read Request as an Uncorrectable Error or an Advisory Non-Fatal Error, the PMA must not set up notification service for that Request.
    - Ordering and Flow Control rules for Rcoh Read Requests are identical to those for Memory Read Requests.
    - Completions for Rcoh Read Requests are identical to Completions for PCIe Memory Read Requests.
- All requirements for PCIe Memory Write Requests apply to Rcoh Write Requests unless explicitly stated otherwise.
    - The Rcoh Write Request TLP format is identical to the PCIe Memory Write Request TLP format except for the Type field code.
    - An Rcoh Write Request must access no more than a single cacheline, as determined by the Rcoh System CLS. A Completer must check for this error case and handle it as a Completer Abort unless the Completer detects a higher precedence error.
    - If a Completer handles an Rcoh Write Request as an Uncorrectable Error, the PMA must not set up notification service for that Request.
    - Ordering, Flow Control, and Data Poisoning rules for Rcoh Write Requests are identical to those for PCIe Memory Write Requests.
    - A Requester must not generate Rcoh Write Requests for MSI or MSI-X interrupts. A Completer must not accept Rcoh Write Requests as legitimate interrupts.
    - If a Completer receives an Rcoh Write to a location where the Completer would handle a Memory Write as an MSI or MSI-X interrupt, the Completer must handle this case as an Unsupported Request (UR), unless the Completer detects a higher precedence error.
    - Rcoh Write Requests must not be handled as Multicast TLPs.
- For Rcoh Read and Rcoh Write Requests, the address must be the proper type, as indicated by the Address Type (AT) field. The proper type depends upon whether a Translation Agent (TA) is being used. See the Address Translation Services (ATS) Specification, Revision 1.0 (available from www.pcisig.com/specifications/iov/ats/), the entirety of which is incorporated herein by reference.
    - If a TA is being used, the address must be a Translated address. A PCA Requester must support ATS in order to acquire and use Translated addresses.
    - If a TA is not being used, the address must be a Default/Untranslated Address.
- For a Switch or an RC, when an Rcoh Read or Rcoh Write Request targets going out a Downstream Port, the Egress Port must handle the Request as an Rcoh Egress Blocked error (see below). For an Rcoh Read Request, the Egress Port must also return a Completion with a Completion Status of UR, and if the severity of the Rcoh Egress Blocked error is non-fatal, this case must be handled as an Advisory Non-Fatal Error as described in the PCIe specification.
- If any endpoint Function in a multi-Function device supports Rcoh Requester capability, all Functions in that device must decode properly formed Rcoh Read or Rcoh Write Requests, and handle any such Requests they receive as an Unsupported Request (UR).
- If an endpoint Function with a PCA undergoes a Conventional Reset or FLR, the PCA must invalidate any cachelines it has cached.

D. Rcoh Protocol Ordering Considerations

Rcoh Read Requests have the same ordering requirements as PCIe Memory Read Requests, and Rcoh Write Requests have the same ordering requirements as PCIe Memory Write Requests. Completions for Rcoh Reads have the same ordering requirements as Completions for PCIe Memory Reads.

Transaction ordering rules permit an Rcoh Invalidate Message to pass a Read Completion. Logically, an Rcoh Requester might assume that the Completion for an Rcoh Read Request will always arrive before an Rcoh Invalidate associated with the same Rcoh Read Request arrives. However, since the Rcoh Invalidate might pass the Completion, the Requester must not make this assumption.

Since Requesters must not assume that a Completion always arrives before an associated Rcoh Invalidate, the Completer for an Rcoh Read Request is permitted to send the Completion and its associated Rcoh Invalidate in either order.

Rcoh protocol by itself is sufficient for a PCA to implement a coherent read-only cache. For the case where a PMA has an outstanding Rcoh Read, and an Rcoh Invalidate for that Read arrives before the associated Completion, the PMA should not cache the data when it arrives. However, for some use models, it still may make sense to use the returned data immediately when it arrives.

E. Rcoh Software Configuration

In some embodiments, the Rcoh protocol supports two cacheline sizes (CLSs)—64 bytes and 128 bytes. Support for each CLS is optional, both for Root Complexes and endpoints. The CLS in use by the system is determined by the host, and is indicated by the Rcoh System CLS field in applicable Root Ports and RCRBs. All Root Ports and RCRBs that indicate Rcoh Completer support should indicate the same CLS, else the results are undefined. The host should not change the Rcoh System CLS while any operating system is running, else the results are undefined.

Endpoints supporting the Rcoh protocol can support either or both CLSs, and indicate which they support via the Rcoh-64 Requester Supported and Rcoh-128 Requester Supported capability bits. Before enabling each Rcoh Requester, software should ensure that the associated Rcoh Requester CLS control bit is configured to match the Rcoh System CLS, else the results are undefined. An Rcoh Requester that supports only one CLS is permitted to hardwire its Rcoh Requester CLS control bit to the corresponding value.

Software should not change the value of the Rcoh Requester CLS control bit in a Requester unless its Rcoh Requester Enable control bit is Clear, and it has no lines cached; otherwise, the results are undefined.

Software should not enable a given Rcoh Requester unless all routing elements between it and the host support Rcoh routing capability. Otherwise, any routing elements without Rcoh routing capability will handle any received Rcoh Requests as Malformed TLPs.

F. Capabilities and Controls

Four new bits in the PCIe Device Capabilities 2 register permit software to discover Rcoh Requester capabilities in endpoints, Rcoh routing capability in routing elements, and Rcoh Completer capabilities in the host.

TABLE 1

DEVICE CAPABILITIES 2 REGISTER

| BIT LOCATION | REGISTER DESCRIPTION | AT-TRIB-UTES |
|---|---|---|
| ... | ... | ... |
| 24 | Rcoh-64 Requester Supported - Applicable only to endpoints; must be 0b for all other Function types. This bit must be set to 1b if the endpoint supports Rcoh protocol for 64-byte cachelines as a Requester. See Section 6.x.3 for additional details. | RO |
| 25 | Rcoh-128 Requester Supported - Applicable only to endpoints; must be 0b for all other Function types. This bit must be set to 1b if the endpoint supports Rcoh protocol for 128-byte cachelines as a Requester. | RO |
| 26 | Rcoh Routing Supported - Applicable only to Switch Upstream Ports, Switch Downstream Ports, and Root Ports; must be 0b for other Function types. This bit must be set to 1b if the routing element supports Rcoh protocol. This bit is HwInit for Root Ports and RO for all other Function types. All Ports of a Switch must have the same value for this bit. | RO/HwInit |
| 28-27 | Rcoh System CLS - Applicable only to Root Ports and RCRBs; must be 00b for all other Function types. This field indicates if the Root Port or RCRB supports Rcoh protocol as a Completer, and if so, what cacheline size is used. Encodings are: 00b Rcoh Completer capability is not supported 01b Rcoh Completer with 64-byte cachelines in use 10b Rcoh Completer with 128-byte cachelines in use 11b Reserved | HwInit |

Two new bits in the Device Control 2 register permit software to enable Requesters to use Rcoh protocol, specifying which CLS to use. Downstream Ports block any Rcoh Read or Rcoh Write Requests that attempt to go Downstream, reporting a new Rcoh Egress Blocked error in AER.

TABLE 2

DEVICE CONTROL 2 REGISTER

| BIT LOCATION | REGISTER DESCRIPTION | AT-TRIB-UTES |
|---|---|---|
| ... | ... | ... |
| 11 | Rcoh Requester Enable - Applicable only to endpoints that indicate support for Rcoh protocol as a Requester; otherwise must be hardwired to 0b. See Section 6.xx. When this bit is Set, the endpoint is enabled to operate as an Rcoh protocol Requester. Default value of this bit is 0b. | RW |
| 12 | Rcoh Requester CLS - Applicable only to endpoints that indicate support for Rcoh protocol as a Requester; otherwise must be hardwired to 0b. This bit controls or indicates the cacheline size used with Rcoh protocol by this Requester. See Section 6.x.3 for restrictions on modifying this bit. If this bit is Clear, the cacheline size is 64 bytes. If this bit is Set, the cacheline size is 128 bytes. If this Rcoh Requester supports only one cacheline size, this bit is permitted to be hardwired to indicate that size. Otherwise, the default value of this bit is 0b. | RW |

IV. EXEMPLARY NOTIFICATION PROTOCOL BASED ENDPOINT CACHING OF HOST CACHE MEMORY USAGE MODELS

A. Introduction

The embodiments of the notification protocol described herein provide a wide variety of different opportunities to eliminate software overhead, enable new communication paradigms (e.g., parallel, lock-free communications), and enable new solution approaches (e.g., use of canonical device definitions (e.g., USB/class driver styles) that leverage the more direct hardware access that is possible using the notification protocol, thereby eliminating the traditional device driver in the main data path. This section describes several exemplary usage models that are enabled by the embodiments of the notification protocol that are described herein.

B. Usage Model—Graphics

Figure 8:
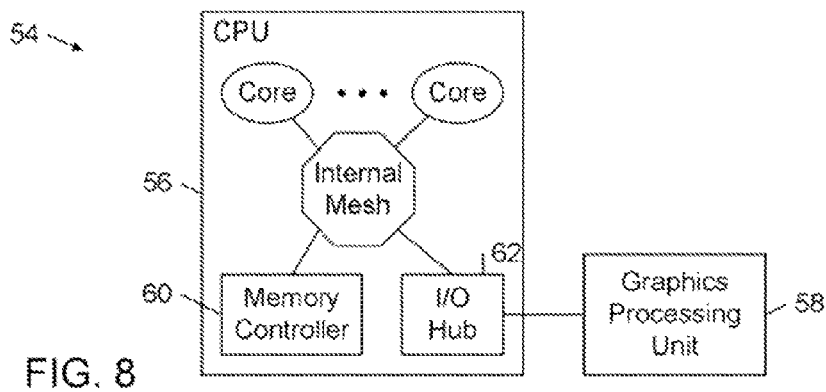
FIG. 8 is a block diagram of an embodiment of a computer system arrangement that includes a CPU connected to a graphics processing unit.

FIG. 8 is a block diagram of an embodiment of a computer system arrangement 54 that includes an embodiment 56 of the host CPU 12 that is connected to a graphics processing unit 58. In this embodiment, the host interface 22 of the host CPU 12 (see FIG. 1) includes a memory controller 60 and an I/O hub 62. The I/O hub 62 includes a PCIe Memory Agent (PMA) and the graphics processing unit 58 includes a PCIe Caching Agent (PCA), which communicate with each other via the Rcoh notification protocol described above.

In operation, the graphics processing unit 58 registers interest in a set of memory cachelines that a user mode application makes available to the graphics processing unit 58 in accordance with a data schema. The application program issues work requests to the graphics processing unit 58. Instead of transferring data to and from memory via programmed I/O through the host CPU I/O ports (which entails ringing doorbells), the application directly accesses the graphics processing unit 58 via Rcoh protocol notification messages. This allows the application to constantly generate work requests and constantly check the specified cachelines to see if work was completed by the graphics processing unit 58, as if the graphic processing unit 58 were completely available to the application. In this mode of operation, however, the resources of the graphics processing unit 58 are never exposed to the user mode application, eliminating the risk of failures that otherwise might be caused by application writes to incorrect memory addresses. Instead, the user mode application writes to a cacheline to indicate that it has finished a work request or that it has finished consuming the results data written by the graphics processing unit 58 to the specified host memory address. For example, in some embodiments, the data schema specifies that the semantics associated with the cacheline written to by the PMA in the I/O hub 62 is associated with a semantic that means that the host memory address is free. Whenever the PMA writes to the host memory address, the PMA generates a Rcoh notification that indicates that cacheline buffer has been freed, and the graphics processing unit 58 is free to use it or repurpose it in accordance with the data schema. In this way, the graphics processing unit 58 can act as if it were completely available to the user mode application without having to expose its resources.

In another exemplary embodiment, the data schema may specify that the notification means that the application has finished consuming the cacheline and that the graphics processing unit 58 should write new data to the cacheline. In response to receipt of the notification by the graphics processing unit 58, the graphics processing unit 58 sends a request to write data to the host memory address. In response to receipt of the request to write the data by the PMA, the PMA writes the data to the host memory address and, in response, sends a notification to the application that the content state of the host memory address has changed. In response to receipt of the notification by the application, the application sends a request to read the data written to the host memory address.

Other data schemas can be defined to achieve a variety of other interactions and behaviors between the host CPU 56 and the graphics processing unit 58.

C. Usage Model—High-Speed I/O

Figure 9:
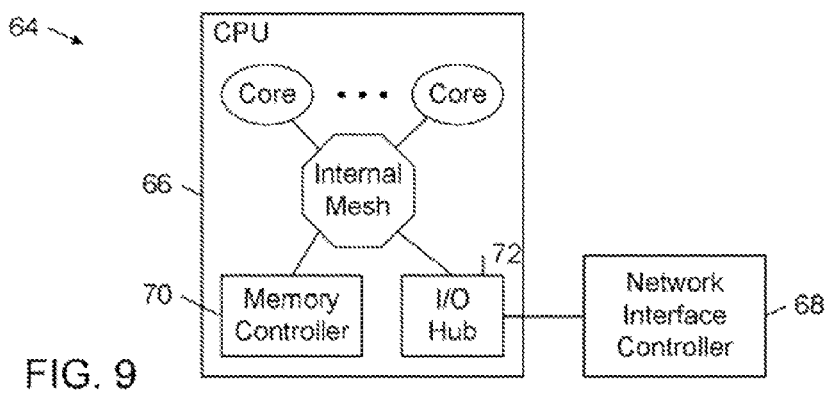
FIG. 9 is a block diagram of an embodiment of a computer system arrangement that includes a CPU connected to a network interface controller.

FIG. 9 is a block diagram of an embodiment of a computer system arrangement 64 that includes an embodiment 66 of the host CPU 12 that is connected to a network interface controller 68. In this embodiment, the host interface 22 of the CPU 12 (see FIG. 1) includes a memory controller 70 and an I/O hub 72. The I/O hub 72 includes a PCIe Memory Agent (PMA) and the network interface controller 68 includes a PCIe Caching Agent (PCA), which communicate with each other via the Rcoh notification protocol described above.

In operation, the network interface controller 68 registers interest in a set of memory cachelines that a user mode application makes available to the network interface controller 68 in accordance with a data schema. The application program issues work requests to the network interface controller 68. Instead of having to move lots of context (a set of memory cache lines that store network state information) to understand state of the connection and how to update it, the application directly accesses the network interface controller 68 via Rcoh protocol notification messages. This allows the application to only move cache lines that have changed instead of having to pull down the entire context. For example, in this mode of operation, the application provides the network interface controller the work 68 request pointer to the context element currently being worked on and the sequence number that indicates where the application is in the stream of bytes being transferred. The application stores the pointer and the sequence number values in a particular cacheline that is specified by the data schema, and the network interface controller 68 only needs to pull down the particular cacheline that contains these two data values. In this way, memory bandwidth consumed for each I/O is reduced because the application only needs to tell the network interface controller 68 where the data has been placed. The network interface controller 68 does not have to request a DMA read in order to retrieve the work request for completion nor does it have to request subsequent DMA reads in order to retrieve the actual data. Instead, the network interface controller 68 is able to DMA read the data stream directly, allowing the network interface controller 68 to transfer the data more efficiently and quickly.

In this mode of operation, the network interface controller 68 receives a Rcoh notification that the pertinent data has been updated and interprets the notification as a work request to read the pointer and sequence number values from the cacheline designated by the schema. Based on these values, the network interface controller 68 can determine the data block to move.

For example, in some embodiments, the data schema specifies that the semantics associated with the particular host memory address means that the host cache memory contains a pointer to a data storage location and that a fixed-sized chunk (e.g., 1 kilobyte chunk) of data offset from the pointer is to be moved. The network interface controller 68 tracks pointers and every time it sees a new pointer value the network interface controller 68 automatically reads a fixed-size chunk of data offset from the pointer and transmits that chunk. In one exemplary embodiment, the PMA receives from the application a request to write the pointer to the host memory address and, in response, the PMA writing the pointer to the host memory address and sends a notification to the network interface controller 68 that the content state of the host memory address has changed. In response to receipt of the notification by the PCA, the network interface controller 68 sends a request to read the host memory address to the PMA. In response to receipt of the request to read, the PMA sends a copy of the pointer from the host memory address to the network interface controller 68 and sends a notification that the host memory address has changed to the application. In response to receipt of the copy of the pointer by the PCA, the network interface controller 68 moves the fixed-sized chunk of data offset from the pointer.

Other data schemas can be defined to achieve a variety of other interactions and behaviors between the host CPU 66 and the network interface controller unit 68.

D. Usage Model—Embedded Devices

Figure 10:
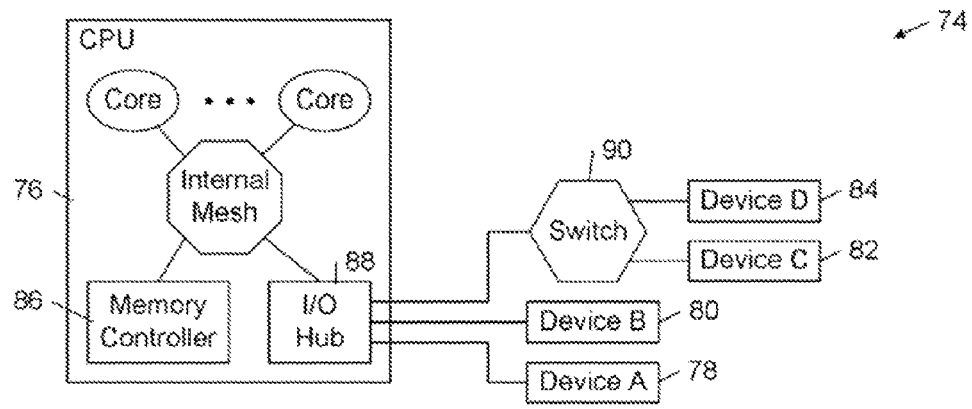
FIG. 10 is a block diagram of an embodiment of a computer system arrangement that includes a CPU connected to multiple endpoint devices.

FIG. 10 is a block diagram of an embodiment of a computer system arrangement 74 that includes an embodiment 76 of the host CPU 12 that is connected to four embedded endpoint devices 78, 80, 82, 84. In this embodiment, the host interface 22 of the host CPU 12 (see FIG. 1) includes a memory controller 86 and an I/O hub 88. The embedded devices 78, 80 are connected directly to the I/O hub 72 and the embedded devices 82, 84 are connected indirectly to the I/O hub 88 via a switch 90. The I/O hub 72 and the switch 90 include respective PCIe Memory Agents (PMAs) and each of the embedded devices 78-84 includes a respective PCIe Caching Agent (PCA). The embedded devices 78-84 communicate with the I/O hub 88 via the Rcoh notification protocol described above.

In operation, each of the embedded devices 78-84 registers interest in a set of memory cachelines in accordance with a data schema. The Rcoh notification protocol together with the data schema can enable a wide variety of interactions between the embedded devices without having to support peer-to-peer interactions and without having to manage vendor relationships. In particular, all the embedded devices 78-84 simply use the data structures defined in the data schema and use the Rcoh protocol to communicate with each other in accordance with the semantics specified in the data schema via updates to the host memory addresses. This allows the devices to interact with one another without having to display confidential information.

In one exemplary embodiment, the data schema specifies that the semantics associated with a particular host memory address means that the host memory address contains a pointer to data to be processed and that the processed data is to be written back to another host memory address. A first one of the endpoint devices 78-84 may register an interest in the particular host memory address. The PMA may receive from a second one of the endpoint devices 78-84 a request to write the pointer to the particular host memory address. In response, the PMA writes the pointer to the host memory address, registers the second endpoint device in association with the host memory address, and sends a notification to the first endpoint device that the content state of the host memory address has changed. In response to receipt of the notification by the first endpoint device, the PCA on the first endpoint device sends a request to read the host memory address. In response to receipt of the request to read the host memory address, the PMA sends a copy of the pointer from the host memory address to the first endpoint device and sends a respective notification that the host memory address has changed to each entity that is registered in association with the host memory address. In response to receipt of the copy of the pointer by the first endpoint device, the first endpoint device processes the data referenced by the pointer to produce processed data and sends a request to write the processed data to the other host memory address. The PMA receives the request to write the processed data to the other host memory address. In response, the PMA writes the processed data to the other host memory address and sends a respective notification that the other host memory address has changed to each entity that is registered in association with the other host memory address.

The interactions described in the preceding paragraph can be used and optionally extended to coordinate a variety of different interactions between the embedded endpoint devices 78-84. For example, in one exemplary embodiment, an embedded Ethernet device receives a frame. The Ethernet device determines that the frame is encrypted and, based on the data schema, writes a pointer to the frame to an appropriate host memory address that is registered in associated with an embedded encryption device. In response to the resulting content state change notification, the encryption device reads the pointer, retrieves the frame, decrypts the frame, and writes the decrypted frame to a host memory address designed by the data schema. The Ethernet device is notified via a Rcoh notification message that the decrypted frame has been written to the designated host memory address. At this point, the Ethernet device may hand off the decrypted frame to another embedded device, hand it up to a user mode application, or send it out over a network.

Other data schemas can be defined to achieve a variety of other interactions and behaviors between the host CPU 76 and the embedded endpoint devices 78-84.

E. Usage Model—Far-Memory Attach

Figure 11:
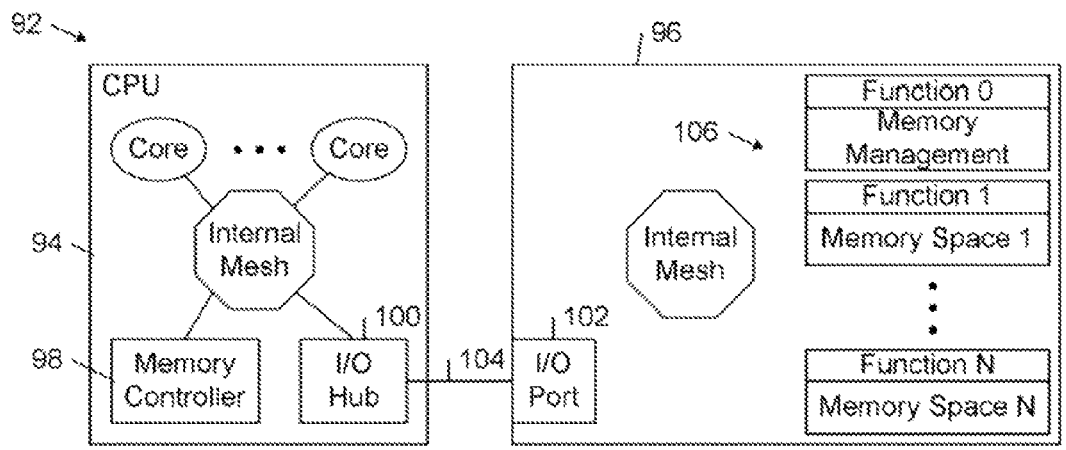
FIG. 11 is a block diagram of an embodiment of a computer system arrangement that includes a CPU connected to a data storage system.

FIG. 11 is a block diagram of an embodiment of a computer system arrangement 92 that includes an embodiment 94 of the host CPU 12 that is connected to a memory device 96. The memory device 96 may be, for example, a solid state memory that is configured as an input/output memory management unit (IOMMU) that maps device-visible virtual addresses to physical addresses. The host interface 22 (FIG. 1) includes a memory controller 98 and an I/O hub 100. The memory device 96 includes an I/O port 102 that is connected to the I/O hub 100 via an interconnect 104, which may be, for example, a point-to-point PCIe switch-based topology or optical source injection interconnect. The I/O hub 72 includes a PCIe Memory Agent (PMA) and the memory device 96 includes a PCIe Caching Agent (PCA). The memory device 96 also includes a memory space 106 that is divided logically into a set of functions (Function 0, . . . , Function N), which enables individual or shared assignment or access control in accordance with a far memory specification.

In one exemplary embodiment, the memory device 96 registers interest in a set of memory cachelines (including a particular host memory address) in accordance with a data schema that establishes a shared memory segment whereby multiple discrete coherency domains or multiple processes are using the shared memory as a communication medium. As with the other usage models, the data schema associates semantics with a given update. The CPU 94 may update the particular host memory address. In response to the notification that the particular host memory address has been updated, the memory device 96 may read data from the host memory address and transmit the read data to another CPU in accordance with the semantics associated with the notification.

In one exemplary embodiment of the computer system arrangement 92, multiple host CPUs (e.g., in the form of blade servers) are attached to the PCIe switch-based topology and the far memory is exported up to each server as memory mapped I/O space such that a processor can access this memory via a load-store paradigm. The processor uses data mover technology such that data is copied into/out of the far memory either by a data mover or a DMA Master engine (e.g. an I/O device), which is programmed to perform the actual data transfer. As with the embedded devices usage model described above, when one server updates memory, notifications are automatically generated down to the device that runs the far memory. When the device receives a content state change notification, one exemplary semantic associated with the notification is to read data from the server generating the notification and then transmit that data to another server. In this way, the far memory acts not only like a shared memory segment but also as a message-passing interface without processor involvement.

F. Usage Model—Distributed Applications

Figure 12:
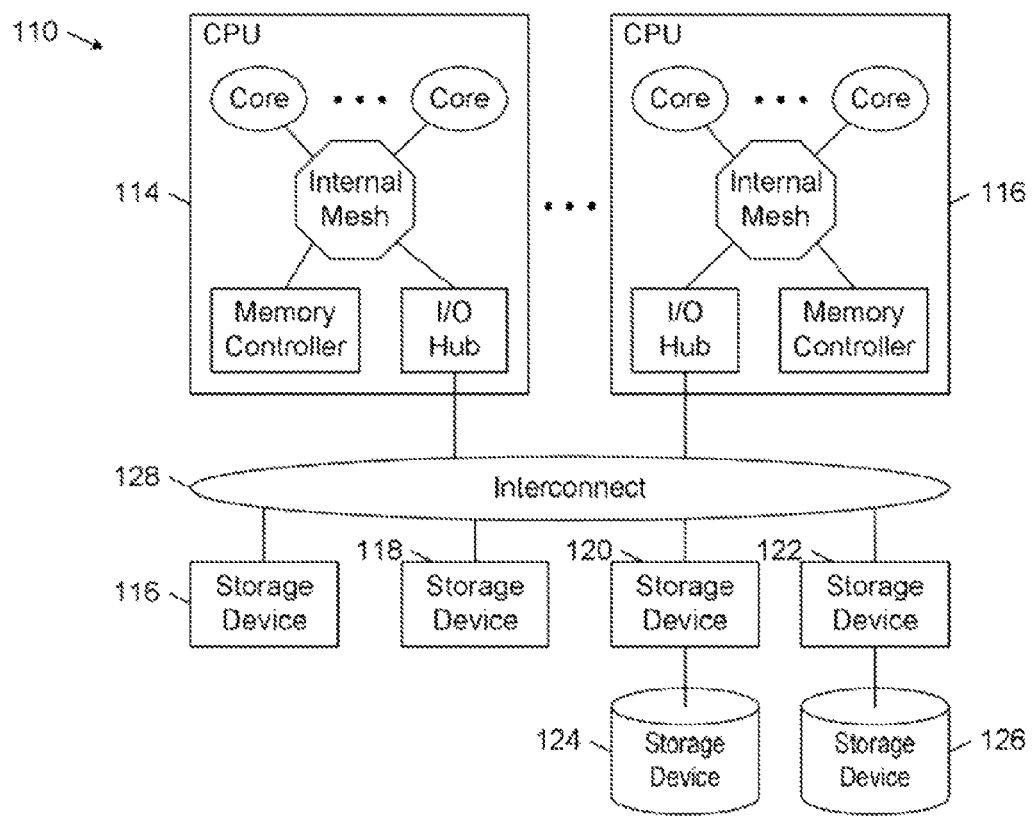
FIG. 12 is a block diagram of an embodiment of a computer system arrangement that includes multiple CPUs connected to multiple storage devices.

FIG. 12 is a block diagram of an embodiment of a computer system arrangement 110 that includes multiple CPUs 112, 114 connected to multiple storage devices 116, 118, 120, 122, 124, 126. Each of the CPUs 112, 114 may be component of a respective cluster node. The storage devices 116-126 may be dedicated or shared PCIe-attached storage devices. The CPUs 112, 114 are connected to each other and to the storage devices 116-126 by a shared interconnect 128 (e.g., a shared PCIe fabric). Each of the storage devices 116-126 includes a respective PCIe Memory Agent (PMA) and each of the CPUs 114, 116 includes a respective PCIe Caching Agent (PCA).

The computer system arrangement 110 corresponds to another example of using the far memory attach usage model described above. In this case, there is no longer a need to have to have high-speed cluster interconnect between the CPUs 112, 114. Instead, the CPUs 112, 114 can all use the Rcoh notification mechanism to communicate with one another, and when memory changes a respective one of the storage devices can proxy between the CPUs 112, 114 in order to implement an interaction specified by the controlling data schema.

The Rcoh notification mechanism avoids message passing overhead and eliminates complex communication paradigm. This approach allows high-speed solid state device or memristor based storage to be accessible by multiple nodes. In operation, an application touches memory location in order to cause Rcoh notifications to be sent out and the storage devices pull application memory without further software involvement. The storage devices determine which CPU should be informed of change in content state and issues notifications to the appropriate nodes. This approach also allows for optional direct placement into node memory or waits for subsequent storage read.

The Rcoh notification approach eliminates complex communication channel configuration and management. It also eliminates scaling bottlenecks (e.g., process/thread scheduling) that defeat the purpose of a low-latency message exchange, eliminates software overhead and maintenance, and simplifies communication while enabling data persistence so less chances for faults or hardware failures (e.g., through lower CAPEX/OPEX)

G. Usage Model—Virtualization

Figure 13:
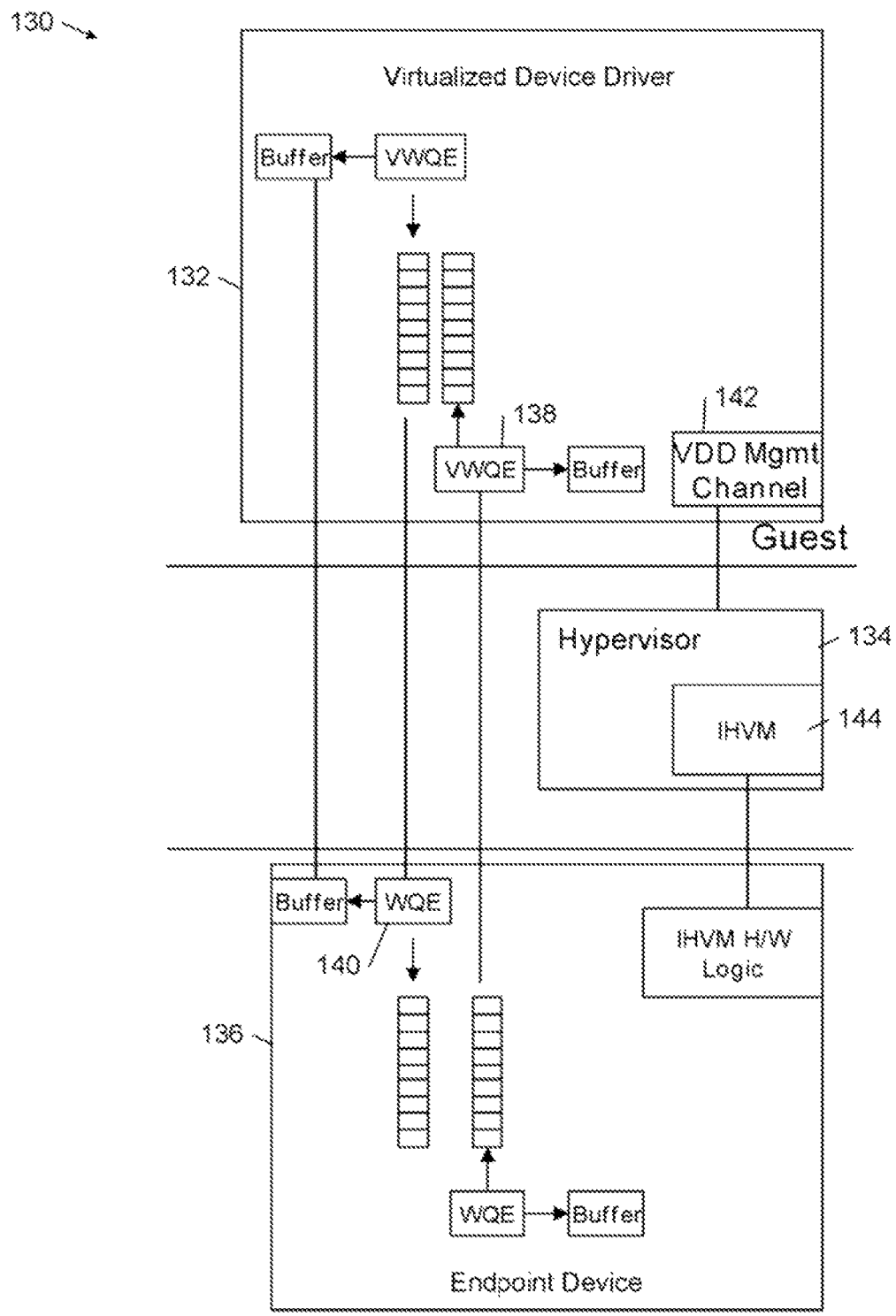
FIG. 13 is a diagrammatic view of an embodiment of an I/O virtualization architecture that includes a virtualized device driver, a hypervisor, and an endpoint device.

FIG. 13 is a diagrammatic view of an embodiment of an I/O virtualization architecture 130 that includes a virtualized device driver 132 (VDD) on a guest operation system (OS), a hypervisor 134, and an endpoint device 136. The virtualized device driver 132 and the hypervisor 134 operate on a host system that includes a PCIe Caching Agent (PCA) and the endpoint device 136 includes a PCIe Memory Agent (PMA).

In this embodiment, the virtualized device driver 132 exposes guest memory to endpoint device 136 (assuming IOMMU available for isolation/translation). In particular, the virtualized device driver 132 exposes a canonical virtualized device representation. This representation may be a de facto/industry standard memory layout of the main data path elements such that the focus is on work request definition. The non-main data path is maintained within the hypervisor 134, which handles resource management, error handling, and hardware access control, among other standard hypervisor tasks. The virtualized device driver 132 prevents direct exposure of device-specific functionality within the guest and prevents direct exposure of device-specific resources within the guest. The Rcoh notification approach enables the endpoint device 136 to read and process work request translating to device-specific as needed. The Rcoh notification approach avoids the need for the guest OS to execute a device-driver. In addition, there is no software to manage or integrate.

In operation, the virtualized device driver 132 creates canonical virtual work requests/posts to a Rcoh accessible exposed work queue. The posting to the work queue triggers memory content state change in accordance with the data schema and triggers the corresponding Rcoh protocol notifications. The endpoint device 136 refreshes memory to acquire the virtualized work queue entry 138 (VWQE). The endpoint device transforms the VWQE into a device-specific work queue entry 140 (WQE). The endpoint device 136 executes the WQE DMAr/DMAw to guest memory. The VDD management channel 142 is used to interact with hypervisor 134. The hypervisor includes an independent hardware vendor (IHV) specific management device driver 144 (IHVM), which is used to access device-specific hardware structures and services.

During guest migration, the virtualized device driver 132 keeps the guest I/O resources in canonical form. All memory and control is migrated to the new target. At the target, the virtualized device driver management channel 142 is used to bind the target's guest information including I/O guest memory to the target hardware. The IHVM 144 works in conjunction with the hypervisor 134 and the VDD 132 to provide all device-specific configurations.

As described above, the Rcoh notification approach allows the endpoint device to export its resources to the guest OS through Rcoh notifications that have the semantics defined in a data schema (e.g., an Ethernet schema). An application executing on the guest OS communicates with the endpoint device 136 in accordance with the data schema in order to manipulate data or control the endpoint device 136 (e.g., to cause an Ethernet frame to be moved or a storage buffer to be moved). The Rcoh notification protocol abstracts away the underlying hardware of the endpoint device 136. The endpoint device 136 simply registers interest in the pertinent host memory addresses specified in the data schema without having to export all its hardware resources. This allows an application executing on the guest OS to have direct access to the endpoint device 136 (as if a device driver were operating on the guest OS) without having to put device driver in guest. Instead, the application communicates with a canonical representation of the endpoint device 136. When the application updates a particular host memory address defined in the data schema, the endpoint device 136 has been configured to know that in canonical form when that address has been manipulated, the endpoint device 136 performs a particular task (e.g., generate a particular transaction out the Ethernet).

H. Usage Model—Checkpoint Restart

Figure 14:
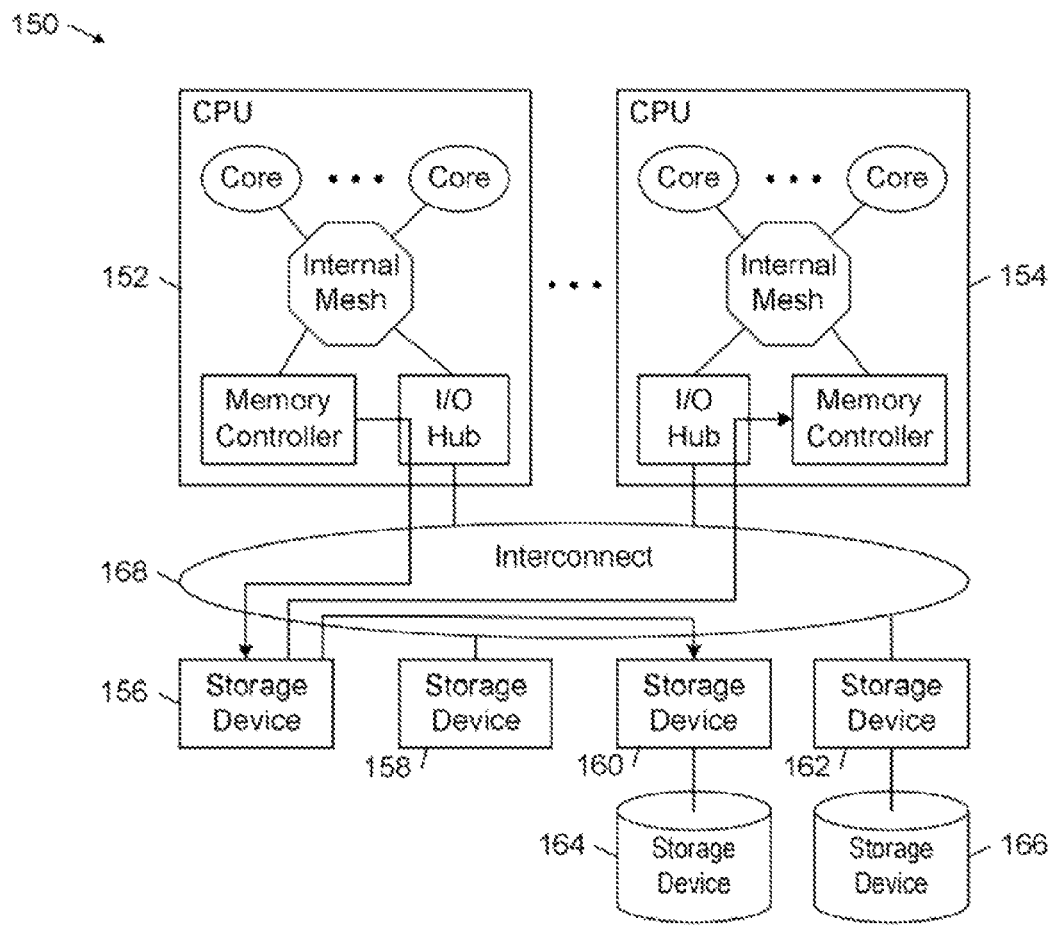
FIG. 14 is a block diagram of an embodiment of a computer system architecture that includes multiple CPUs connected to a plurality of storage devices via an interconnect.

FIG. 14 is a block diagram of an embodiment of a computer system architecture 150 that includes multiple CPUs 152, 154 that are connected to a plurality of storage devices 156, 158, 160, 162, 164, 166 via an interconnect 168. In the illustrated embodiment, the storage devices 156-162 are non-coherent solid state memory devices. The storage devices 164, 166 typically are implemented by storage arrays. Each of the storage devices 156-166 includes a respective PCIe Memory Agent (PMA) and each of the CPUs 152, 154 includes a PCIe Caching Agent (PCA).

In operation, the CPUs 152, 154 operate in parallel on a particular application. Periodically, a snapshot is taken of the execution state of the application in each of the CPUs 152, 154. Each snapshot is stored in a respective one of the non-coherent solid state memory devices 156-162. The solid state memory view of each CPU 152, 154 is made available to other CPUs as needed by reconfiguring the solid state storage devices to be an I/O device under another core. This allows the other CPU to repopulate its application state by replaying events to re-synchronize the other CPU back into a full application core set. This enables the application to proceed with only moderate degradation for a limited period of time rather than requiring a complete restart of all the cores and then, as the state restored, enable all application cores to operate at full speed.

As soon as all the CPUs 152, 154 have backed-up the respective application execution state data to the local solid state storage devices 156, 158, the CPUs 152, 154 can resume execution of the application. The execution states stored on the solid state storage devices 156-162 are asynchronously backed-up to the secure long-term data storage devices 164, 166. If a failure occurs, the CPUs can read back (restart) the data corresponding to the last snapshot from the long-term storage devices 164, 166. The Rcoh notification protocol is used to transfer the application execution state data from the solid state memory devices 156-162 to the long-term storage devices 164, 166. In particular, each of the solid state The storage devices 156-166 communicate using the Rcoh notification protocol in order to transfer the storage application state data from the solid state storage devices 156-162 to the long-term storage devices 164-166. In operation, each of the storage devices 156-162 registers interest in respective sets of host memory addresses in accordance with a data schema. The Rcoh notification protocol together with the data schema enable the storage application state data to be transferred from the solid state storage devices 156-162 to the long-term storage devices 164-166 without having to support peer-to-peer interactions and without having to manage vendor relationships. Instead, all the storage devices 156-162 simply use the data structures defined in the data schema and use the Rcoh protocol to communicate with each other in accordance with the semantics specified in the data schema via updates to the host memory addresses. In this process, the solid state storage devices 156-162 use host cache memory to push the data to the long-term storage devices 164-166, where long-term storage device drivers on the host systems write the data out to the interface controller of the long-term storage devices 164, 166.

I. Usage Model—Power Management

In some embodiments, the Rcoh notification protocol is used to implement a power management process in which a host CPU can communicate its power state to one or more endpoint devices. In these embodiments, a data schema specifies that the semantics associated with one or more host memory addresses means that the host CPU is operating in one or more power states. In operation, the endpoint devices register an interest in the host memory addresses designated by the data schema. Whenever the host CPU determines that it is time to enter a particular one of the power states, the host CPU updates the host memory address associated with the particular power state. The PMA operating on the host CPU sends a notification to each of the endpoint devices registered in association with the updated host memory address. In response to the receipt of the notification, each endpoint device translates the notification into an action in accordance with the power state of operation of the host processor and the endpoint performs the action.

In some embodiments, each of the host memory addresses specified in the data schema corresponds to a different functional area or represents a host or device resource set (creates a more scalable solution). Each address also may indicate what degree of endpoint device wake-up is implied. For example, if the addresses represented work queue depth, the device could perform a partial wake up for a shallow depth or a full wake up if the depth is deep. The power management schema could also be tied into the power savings associated with an external link. For example, if the device is only partially waking up, the external link may operate at a lower bandwidth rate while if it is fully awake, the device may want to bring the link up to full bandwidth. In some embodiments, the endpoint device optionally writes to a memory location indicating it is entering a low-power state.

In some embodiments, user mode applications or the operating system executing on the host system check the memory locations specified in the data schema before determining whether to signal a wake up or just to validate device status. When the application/OS become active, they update the a priori memory address, which causes a Rcoh notification to be generated waking up the device Among the advantages of this usage model are the following. User mode applications and the operating system can unaware of device-specific control structures; they only need to comprehend memory addresses and update accordingly. This is also ideal for a virtualized environment since the hardware-specifics are not exposed to the guest OS. This approach does not stall the processor, which otherwise would have to wait for the endpoint device to power up, etc. in order to complete an operation, such as a PIO write. This usage model is scalable in that multiple devices could be notified from a single update or selectively updated. This would allow a complex system to tailor its power consumption saving power and money for customers. Rcoh memory addresses can also be used to comprehend what system memory is powered up and being accessed by I/O devices.

V. CONCLUSION

The embodiments that are described herein provide improved I/O communications with reduced CPU involvement. These embodiments leverage notification protocol based endpoint caching of host cache memory in order to reduce CPU involvement in I/O communications. The cache-based notification protocol enables I/O latency and consumed I/O bandwidth to be reduced significantly. In addition, this protocol also enables direct signaling between host software and endpoint devices.

Other embodiments are within the scope of the claims.

What is claimed is:

1. A method, comprising:
   tracking caching of cachelines of host memory within a host central processing unit (CPU) that runs an application by a memory agent, wherein the application implements a usage model in accordance with a data schema that associates semantics with host memory addresses of the cachelines;
   managing cached data within an endpoint device connected to the host CPU by a caching agent, wherein responsive to notifications from the memory agent that the content states of the host memory addresses have changed, the caching agent reads the data schema to determine the semantics respectively associated with the host cache memory addresses with changed contents;
   registering the endpoint device in association with a particular one of the host memory addresses by the memory agent in response to receipt of a request for notification of changes in content state of the particular host memory address from the caching agent;
   in response to completion of a task, sending the memory agent a request to write data to the particular host memory address by the application;
   in response to the request to write the data from the application, writing the data to the particular host memory address by the memory agent and, in response, sending a notification that the particular host memory address has changed content state to the caching agent; and
   in response to receipt of the notification from the memory agent, reading the data schema to determine the semantics associated with a change of content state of the particular host memory address by the endpoint device, wherein the data schema specifies that the semantics associated with the host memory address means that the particular host memory address is free for communicating data between the endpoint device and the application and, in response, using the particular host memory address to communicate data with the application in accordance with the determined semantics by the endpoint device.

2. The method of claim 1, wherein the registering is performed by the memory agent in response to receipt of an access request from the caching agent, and the access request comprises a request to access the particular host memory address and the request for notification of changes in content state of the particular host memory address.

3. The method of claim 2, wherein the access request comprises a request to read data stored in the particular host memory address, and further comprising sending, by the memory agent, a copy of the data stored in the host memory address to the caching agent in response to the request to read the data, and storing the copy of the data in the endpoint device by the caching agent.

4. The method of claim 3, further comprising contemporaneously with the receipt of the access request, receiving a second request to read the data stored in the particular host memory address from a second caching agent managing cached data within a second endpoint device connected to the host CPU, and sending a second copy of the data to the second caching agent in response to the second request to read the data, and storing the second copy of the data in the second endpoint device by the memory agent.

5. The method of claim 3, further comprising invalidating the copy of the data stored by the caching agent in the endpoint device in response to receipt of the notification that the particular host memory address has changed content state.

6. The method of claim 2, wherein the access request comprises a request to write data to the particular host memory address, and further comprising writing the data to the particular host memory address by the memory agent in response to the request to write the data.

7. The method of claim 1, wherein one or more memory agents of the host CPU communicate with one or more caching agents of the endpoint device in accordance with programmed instructions that reference the semantics specified in the data schema by sending requests to write to the host memory addresses of the cachelines of host memory, receiving notifications of changes of content state of the host memory addresses resulting from the requests to write, and performing actions in accordance with the semantics.

8. The method of claim 7, wherein the one or more caching agents determine the semantics by translating notifications received in response to updates to one or more host memory addresses corresponding to a first portion of the data schema into a first semantic, and translating notifications received in response to updates to one or more host memory addresses corresponding to a second portion of the data schema into a second semantic.

9. The method of claim 8, wherein the translating of the notifications comprises translating the notifications into at least one action to be performed by the endpoint device selected from advancing to a next work request, obtaining a next block of memory for movement, advancing to a next round of calculation, and returning a result from a calculation by the one or more caching agents.

10. The method of claim 1, wherein the sending of the notification comprises sending, by the memory agent, a respective notification to the caching agent that the content state of the particular host memory address has changed to each of multiple computing components that are registered in association with the particular host memory address.

11. The method of claim 1, further comprising:
in response to receipt of the notification of the content state change from the memory agent, sending a request to write data to the host memory address by the caching agent;
in response to receipt of the request to write the data from the caching agent, writing the data to the host memory address by the memory agent and, in response, sending a notification to the application that the content state of the particular host memory address has changed;
in response to receipt of the notification by the application, sending from the application a request to read the data written to the host memory address.

12. The method of claim 1,
further comprising updating a second one of the host memory addresses by the memory agent;
wherein the caching agent reads the data schema to determine semantics associated with the updating of the second host memory address by translating the notification received in response to the updating of the second host memory address into an action to read data from the second host memory address of the first host CPU and transmits the read data to a host memory address of a second host CPU in accordance with the determined semantics.

13. The method of claim 1, wherein the host CPU and a second host CPU are nodes in a cluster of nodes connected to the endpoint device, the first and second CPUs run respective instances of an application that implements a usage model in accordance with a second data schema that associates second semantics with shared memory addresses of the cachelines within the endpoint device, and the endpoint device comprises a memory agent that tracks shared memory within the endpoint device; and further comprising:
registering the first and second host CPUs in association with a particular one of the shared memory addresses by the memory agent of the endpoint device;
accessing a second one of the host memory addresses by the first instance of the application;
and in response to the updating of the second host memory address, updating data stored in the shared memory at the particular shared memory address and transmitting a notification of a change of content state of the particular shared memory address to the second instance of the application operating on the second host CPU in accordance with the second semantics by the memory agent of the endpoint device, and updating the data stored in the particular shared memory address and transmitting a notification of a change in content state of the particular shared memory address to the first and second instances of the application by the memory agent of the endpoint device.

14. The method of claim 1, further comprising:
updating the particular host memory address by a guest operating system executing concurrently with a host operating system on a shared host computing system;
translating the notification received in response to the updating of the particular host memory address into an action in accordance with the determined semantics by the caching agent; and
performing the action by the endpoint device.

15. The method of claim 1, further comprising:
storing a current execution state of an application in a local storage device, writing to the particular host memory address by the local storage device in response to the storing of the current execution state, and writing a block of the stored execution state to another host memory address; and
translating the notification received in response to the writing to the particular host memory address by the local storage device into an action to read the block of the stored execution state of the application from the other host memory address by the caching agent; and
reading the block of the stored execution state of the application from the other host memory address by the endpoint device.

16. The method of claim 1, wherein the data schema specifies that the semantics associated with the particular host memory address means that a host CPU is operating in a particular power state; and further comprising:
updating the particular host memory address by the memory agent;

translating the notification received in response to the updating of the particular host memory address into an action in accordance with the power state of operation of the host processor by the caching agent; and performing the action by the endpoint device.

17. A method, comprising:

tracking caching of cachelines of host memory within a host central processing unit (CPU) that runs an application by a memory agent, wherein the application implements a usage model in accordance with a data schema that associates semantics with host memory addresses of the cachelines;

managing cached data within an endpoint device connected to the host CPU by a caching agent, wherein responsive to notifications from the memory agent that the content states of the host memory addresses have changed, the caching agent reads the data schema to determine the semantics respectively associated with the host cache memory addresses with changed contents;

registering the endpoint device in association with a particular one of the host memory addresses by the memory agent in response to receipt of a request for notification of changes in content state of the particular host memory address from the caching agent;

in response to completion of a task, sending the memory agent a request to write data to the particular host memory address by the application, the data comprising a pointer to a data storage location;

in response to the request to write the data from the application, writing the data to the particular host memory address by the memory agent and, in response, sending a notification that the particular host memory address has changed content state to the caching agent; and in response to receipt of the notification from the memory agent, reading the data schema to determine the semantics associated with a change of content state of the particular host memory address by the endpoint device, wherein the data schema specifies that the semantics associated with the host memory address means that the host memory address contains a pointer and that a fixed-sized chunk of data offset from the pointer is to be moved and, in response, determining the pointer and moving the fixed-sized chunk of data in accordance with the determined semantics by the endpoint device.

18. A method, comprising:

tracking caching of cachelines of host memory within a host central processing unit (CPU) that runs an application by a memory agent, wherein the application implements a usage model in accordance with a data schema that associates semantics with host memory addresses of the cachelines;

managing cached data within an endpoint device connected to the host CPU by a caching agent, wherein responsive to notifications from the memory agent that the content states of the host memory addresses have changed, the caching agent reads the data schema to determine the semantics respectively associated with the host cache memory addresses with changed contents;

registering the endpoint device in association with a particular one of the host memory addresses by the memory agent in response to receipt of a request for notification of changes in content state of the particular host memory address from the caching agent;

in response to completion of a task, sending the memory agent a request to write data to the particular host memory address by the application, the data comprising a pointer to data to be processed;

in response to the request to write the data from the application, writing the data to the particular host memory address by the memory agent and, in response, sending a notification that the particular host memory address has changed content state to the caching agent; and in response to receipt of the notification from the memory agent, reading the data schema to determine the semantics associated with a change of content state of the particular host memory address by the endpoint device, wherein the data schema specifies that the semantics associated with the host memory address means that the host memory address contains a pointer to data to be processed and that the processed data is to be written back to another host memory address and, in response, determining the pointer, processing the data to be processed, and writing the processed data back to another one of the host memory addresses in accordance with the determined semantics by the endpoint device.

19. The method of claim 17, further comprising:

in response to receipt of the notification from the memory agent, sending a request to read the particular host memory address by the caching agent;

in response to receipt of the request to read from the caching agent, sending a copy of the pointer from the particular host memory address to the endpoint device and sending a notification that the content state of the particular host memory address has changed to the application by the memory agent; and in response to receipt of the copy of the pointer by the caching agent, moving the fixed-sized chunk of data offset from the pointer in accordance with the determined semantics.

20. The method of claim 18, wherein the method further comprises:

receiving from a caching agent of a second endpoint device a request to write the pointer to the particular host memory address and, in response, writing the pointer to the particular host memory address, registering the second endpoint device in association with the particular host memory address, and sending a notification to the caching agent of the first endpoint device that the content state of the particular host memory address has changed by the memory agent;

in response to receipt of the notification from the memory agent, sending a request to read the particular host memory address by the caching agent of the first endpoint device;

in response to receipt of the request to read from the caching agent of the first endpoint device, sending a copy of the pointer from the particular host memory address to the caching agent of the first endpoint device and sending a respective notification that the particular host memory address has changed to each entity that is registered in association with the particular host memory address by the memory agent;

in response to receipt of the copy of the pointer from the memory agent, processing the data referenced by the pointer to produce processed data and sending the memory agent a request to write the processed data to the other host memory address by the first endpoint device; and receiving the request to write the processed data to the other host memory address and, in response, writing the processed data to the other host memory address and sending a respective notification that the other host memory address has changed to each entity that is registered in association with the other host memory address by the memory agent.

* * * * *